(12) United States Patent
Hess et al.

(10) Patent No.: US 12,036,626 B2
(45) Date of Patent: Jul. 16, 2024

(54) GLASS WELDING THROUGH NON-FLAT SURFACE

(71) Applicant: Neuralink Corp., Fremont, CA (US)

(72) Inventors: Joshua S. Hess, Dublin, CA (US); Emilienne M. Repak, Oakland, CA (US)

(73) Assignee: Neuralink Corp., Fremont, CA (US)

( * ) Notice: Subject to any disclaimer, the term of this patent is extended or adjusted under 35 U.S.C. 154(b) by 137 days.

(21) Appl. No.: 17/466,985

(22) Filed: Sep. 3, 2021

(65) Prior Publication Data

US 2023/0069855 A1 Mar. 9, 2023

(51) Int. Cl.
*B23K 26/24* (2014.01)
*B23K 26/00* (2014.01)
*B23K 26/064* (2014.01)

(52) U.S. Cl.
CPC .......... *B23K 26/24* (2013.01); *B23K 26/0006* (2013.01); *B23K 26/064* (2015.10)

(58) Field of Classification Search
CPC ... B23K 26/0006; B23K 26/064; B23K 26/24
USPC .................................................... 219/121.64
See application file for complete search history.

(56) References Cited

U.S. PATENT DOCUMENTS

| | | | | |
|---|---|---|---|---|
| 4,023,005 A | * | 5/1977 | Bolin | B23K 26/18 |
| | | | | 219/121.64 |
| 5,932,120 A | * | 8/1999 | Mannava | F01D 5/286 |
| | | | | 219/121.84 |
| 6,210,507 B1 | * | 4/2001 | Hansen | B29C 66/1122 |
| | | | | 156/308.2 |
| 6,339,205 B1 | * | 1/2002 | Nakayama | B23K 37/0461 |
| | | | | 219/121.36 |
| 7,211,763 B2 | * | 5/2007 | Zhang | G02B 6/032 |
| | | | | 219/121.64 |
| 7,345,258 B2 | * | 3/2008 | Yasuda | B29C 66/652 |
| | | | | 219/121.64 |
| 8,404,992 B2 | * | 3/2013 | Kawamura | B23K 26/32 |
| | | | | 219/121.64 |
| 8,601,834 B2 | * | 12/2013 | Matsumoto | H01J 31/127 |
| | | | | 445/44 |
| 10,286,416 B2 | * | 5/2019 | Han | B23K 26/146 |

(Continued)

FOREIGN PATENT DOCUMENTS

| | | | | |
|---|---|---|---|---|
| CN | 107382044 A | * | 11/2017 | ............ C03C 17/06 |
| CN | 110077000 A | * | 8/2019 | ............ B29C 65/16 |
| JP | 2009252571 A | * | 10/2009 | |

*Primary Examiner* — Jimmy Chou
(74) *Attorney, Agent, or Firm* — Kilpatrick Townsend & Stockton LLP (57) ABSTRACT

Methods and systems of using a laser beam to weld an object with a non-flat surface, including curved surfaces, are described, where at least one piece of the object is transparent. An optical guide with a flat surface and an interface surface is placed on a piece of an object to welded. The interface surface is fabricated to form-fit the non-flat surface of the object to be welded, and is opposite the flat surface. A liquid optical medium is applied between the non-flat surface and the interface surface, filling any gaps or surface defects. The laser beam is then transmitted through the optical guide, liquid optical medium, and into the object to be welded, to a location to be welded. The laser beam then welds the object to be welded at pre-determined points.

11 Claims, 7 Drawing Sheets

(56) References Cited

U.S. PATENT DOCUMENTS

| | | | | |
|---|---|---|---|---|
| 11,648,625 B2* | 5/2023 | Rouillon | ............. | H01M 8/0232 |
| | | | | 219/121.64 |
| 2003/0010759 A1* | 1/2003 | Accou | ..................... | H01L 24/81 |
| | | | | 257/E21.511 |
| 2003/0098295 A1* | 5/2003 | Kawamoto | .......... | B23K 26/067 |
| | | | | 219/121.75 |
| 2006/0237129 A1* | 10/2006 | Chen | ..................... | B29C 66/003 |
| | | | | 219/121.76 |
| 2006/0237401 A1* | 10/2006 | Amesbury | ......... | B23K 26/0604 |
| | | | | 219/121.76 |
| 2010/0155374 A1* | 6/2010 | Rabinovich | ........ | B23K 35/0261 |
| | | | | 219/121.13 |
| 2011/0083758 A1* | 4/2011 | Tsujiuchi | ............. | B29C 66/114 |
| | | | | 219/121.64 |
| 2013/0029215 A1* | 1/2013 | Signorelli | ........... | H01M 50/191 |
| | | | | 361/518 |
| 2013/0068384 A1* | 3/2013 | Liu | ......................... | B32B 37/06 |
| | | | | 219/121.61 |
| 2013/0302545 A1* | 11/2013 | Schnelker | ........... | B23K 33/006 |
| | | | | 219/121.64 |
| 2014/0231021 A1* | 8/2014 | Liu | ...................... | C03B 23/203 |
| | | | | 219/121.64 |

\* cited by examiner

GLASS WELDING THROUGH NON-FLAT SURFACE

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

BACKGROUND

1. Field of the Invention

Embodiments of the present invention generally relate to laser welding. More specifically, embodiments relate to laser-welding objects where at least one portion of the object is clear.

2. Description of the Related Art

Laser welding techniques offer many benefits over traditional welding techniques. As an example, laser welding can offer greater precision due to a laser beam's application of energy to a narrower area as compared to other welding techniques. Because the energy generated by a laser beam is applied to a much smaller area on the object to be welded, there is less risk of heat distortion and other unwanted effects of welding. Furthermore, laser welding enables the joining of dissimilar materials, allowing complex joints to be welded with relative ease.

Laser welding is not without its drawbacks, however. Because laser welding relies on the energy of the laser beam being sufficiently transmitted to an area to be welded, problems can arise when the shape or composition of an object prevents some or all of the laser beam from reaching the intended point. This is especially true if the intended weld point is not on the surface of the object. For example, an intended weld point of an object may beneath a clear, curved surface of an object. In order to reach the weld point, the laser beam may need to be incident on the curved surface and transmitted through a portion of the object. When a laser beam is incident on a curved surface, portions of the laser beam will have slightly differing angles of incidence. This is especially true for lasers utilizing conical laser beams due to their inherent greater width as compared to other laser beams. The difference in the angles of incidence between the two sides of a conical laser beam can lead to the laser beam being bent as it is transmitted through the object, and the focal point of the laser beam may being distorted. These effects will attenuate the power delivered to a location to be welded. As the curve steepens, these effects will increase and the power of the laser beam will be further attenuated. Because of this, laser welding cannot be accomplished through surfaces where the curvature of the surface exceeds a certain degree.

A related problem exists even on non-curved surfaces. As a laser beam approaches the edge of an object to be welded, one side of the laser will no longer be incident on the object. This is an effect known as "clipping." Due to clipping, the power of the laser beam is attenuated as the focal point of the laser beam moves closer to the edge. Eventually, welding cannot be accomplished because too much energy is lost due to clipping. Laser welds may be made close to the edge of an object, but cannot reach the true edge of the object. As with curved surfaces, this problem is exacerbated with conical laser beams.

Another issue with laser welding is that an object must be able to transmit the laser beam to the intended weld point efficiently enough to enable welding. Superficial flaws on a surface may be present due to the manufacturing process. Shaping through grinding, for example, can leave a rough finish on a normally transparent object. The rough surface can scatter and/or absorb energy from a laser beam such that welding becomes impossible.

Certain applications may require laser welding in order to meet manufacturing criteria. Biological implants, for example, may require a housing made from glass to prevent bio-reactivity to the shell. Furthermore, the housing must be hermetically sealed to prevent bodily fluids from corroding or degrading componentry inside the housing. Likewise, a hermetic seal prevents any substances inside the housing from leeching into body tissue.

At the same time, an implant housing may require rounded edges to not prevent discomfort or tissue erosion with the implant. Laser welding would be one option to join pieces of an implant housing together, as the welds are smooth and would hermetically seal the implant housing. However, because biological implants require rounded surfaces, laser welding may be impractical due to the issues discussed above. Shaping the rounded or curved edges may leave a rough finish on the curved surface, making transmission of a laser beam through the surface impractical. Furthermore, an implant may require full edge-to-edge welding, presenting clipping issues. Improvement in the art is therefore necessary to enable laser welding through curved or irregular surfaces, surfaces with rough finishes, and edge-to-edge laser welding.

BRIEF SUMMARY

Embodiments of the present invention overcome laser-welding issues such as welding through a curved or irregular surface and edge-to-edge welding. An object, with at least one curved or otherwise non-flat surface (hereinafter "curved surface") may need to be laser welded at a point which requires the laser beam to pass through the curved surface. A liquid optical medium, such as mineral oil, is applied to one or more surfaces of the workpiece, including the curved surface. An optical guide is placed on the workpiece, such that the liquid optical medium forms a layer between the optical guide and the workpiece. Both the liquid optical medium and the optical guide is be chosen such that their indices of refraction are substantially equal to that of the workpiece.

The liquid optical medium fills surface imperfections on the object to be welded as well as fill any gaps between the optical guide and the workpiece. Because the optical guide, liquid optical medium, and workpiece have substantially equal indices of refraction, light from a laser beam is pass through all three pieces with minimal unwanted refraction. Furthermore, the geometry of the optical guide is configured to attenuate clipping effects as the laser beam nears an edge of the workpiece. Using these methods, edge-to-edge laser welding through rough surfaces of any geometry, including curved surfaces, is enabled.

Some embodiments of the present invention are related to a method of laser welding through a curved, transparent material. A transparent first piece is provided. The first transparent piece includes a first target surface and a curved surface, opposite to the first target surface. A second piece is be provided, with a second target surface to be welded to the first target surface to form a workpiece. A liquid optical medium is applied to at least the curved surface of the first piece. An optical guide is then mated to the curved surface, where the optical guide has a flat surface opposite to an interface surface. The interface surface form-fits the curved surface. The liquid optical medium fills any surface imperfections and/or gaps between the optical guide and the curved surface. A laser beam is directed at the flat surface of the optical guide, the liquid optical medium, and through the curved surface to the first and second target surfaces. The transparent first piece and second piece is then joined, using the laser beam, at the first and second target pieces.

In some embodiments, applying the liquid optical medium includes submerging the first transparent piece, the second piece, and the optical guide in the liquid optical medium. In other embodiments, applying the liquid optical medium to the curved surface includes applying the liquid optical medium to the optical guide, then mating the optical guide to the curved surface.

In some embodiments, the optical guide covers both the first target surface and the second target surface. The optical guide also includes an index of refraction substantially equal to a material used to fabricate the first transparent piece.

In some embodiments, the first transparent piece may include glass. The second piece may include one or more of silicon, metals, and glass.

In some embodiments, the liquid optical medium includes an index of refraction substantially equal to that of a material used to fabricate the first transparent piece. In some embodiments, the liquid optical medium is mineral oil.

In some embodiments, joining, using the laser beam, includes determining a first location on either the transparent first piece or the second piece. A final location is then determined, on the piece opposite to the piece including the first location. A path is defined between the first and final locations, and a laser beam directed along the path. The first piece and second piece are welded together to form the workpiece. In some embodiments, an operating pulse frequency of the laser beam is within a range of 1.0 to 500 femtoseconds, inclusive. Joining, using the laser beam also includes edge-to-edge welding.

Some embodiments of the present invention are directed towards a system for laser welding through a curved transparent material. The system includes an optical guide, with an interface surface and a flat surface opposite the interface surface. The interface surface form-fits a curved workpiece. The system includes a liquid optical medium with a refractive index within 10% if an index of refraction associated with the curved workpiece.

In some embodiments, the optical guide extends past a location to be welded on the curved workpiece. A first piece of the curved workpiece may include glass. A second piece of the curved workpiece may include one or more of silicon, metals, and glass. In some embodiments, the curved workpiece includes an uneven surface geometry.

In some embodiments, the optical guide and curved workpiece are submerged in the liquid optical medium. In some embodiments, the liquid optical medium is mineral oil.

DETAILED DESCRIPTION

Laser welding techniques provide advantages over other welding methods in providing greater precision and the ability to weld varying and dissimilar materials, such as glass to glass, glass to silicon, and glass to metals. Many applications may benefit from the advantages provided by laser welding. Other constraints associated with these applications, however, may make laser welding using current techniques impossible. An example of these constraints are objects to be welded with a curved surface and/or a rough surface. Other examples include object to be welded wherein a weld is needed at the edge of the object, regardless of the object's geometry.

Embodiments herein enable laser welding to be used in applications wherein the object to be welded, or workpiece, has a curved surface and/or a rough surface. An optical guide may be fabricated with an interface surface, form-fit to a surface of the workpiece. The optical guide may also include a flat surface opposite to the interface surface. Because the interface surface of the optical guide is form-fit to the workpiece and has a flat surface opposite the interface surface, the curved surface is effectively flattened. In effect, a laser beam used for welding is no longer incident on the surface of the workpiece, but on the optical guide instead. Any attenuation of the laser beam due to the curvature of the workpiece would therefore be minimized to be within an acceptable range. The application of a liquid optical medium between the optical guide and the workpiece, may fill any surface imperfections and/or gaps and allow the laser beam to propagate through the entire assembly as if the assembly were one body.

Figure 1:
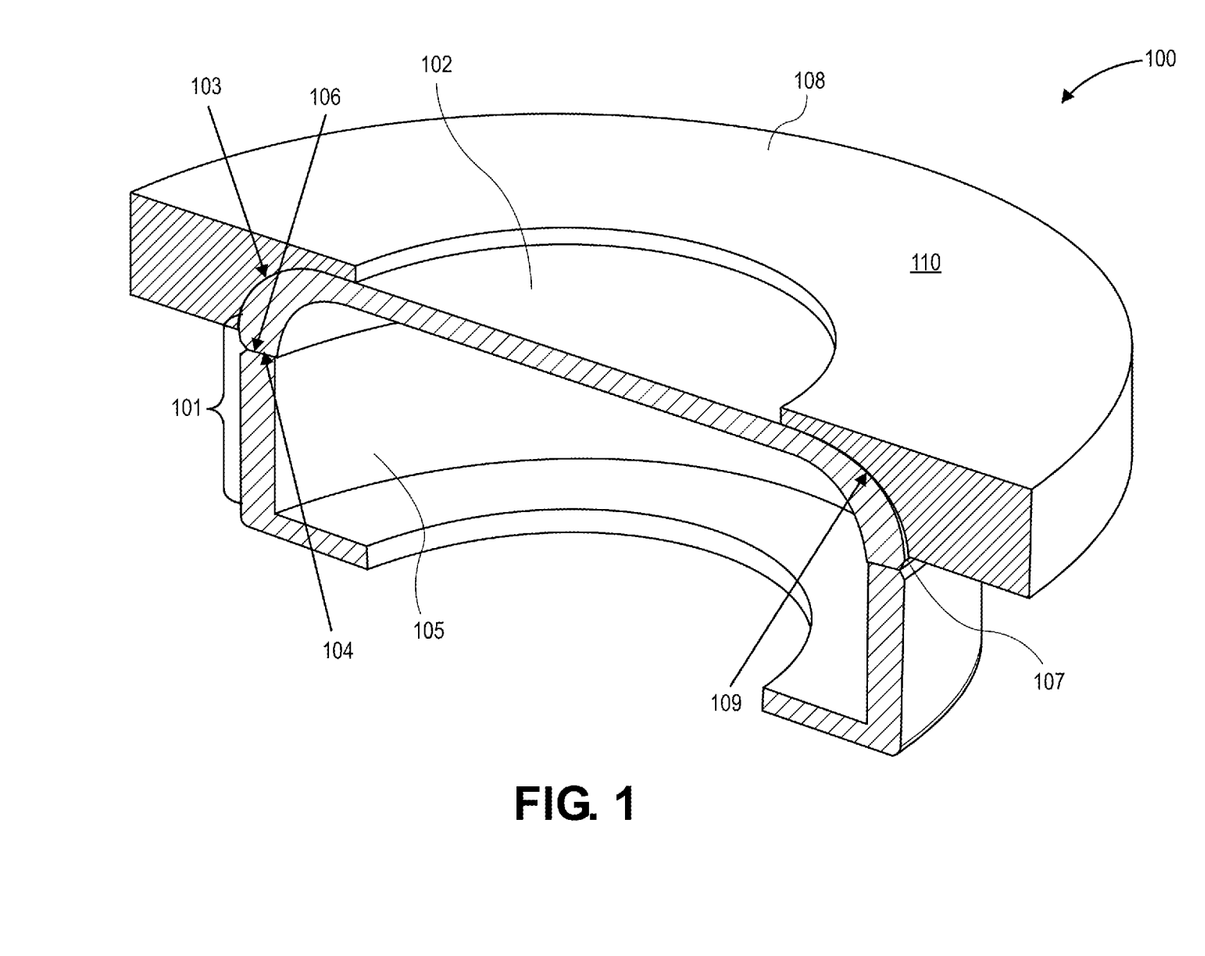
FIG. 1 illustrates a workpiece and an optical guide according to certain embodiments.

FIG. 1 shows a workpiece and an optical guide according to certain embodiments. An assembly 100 shows a workpiece 101, a liquid optical medium 107, and an optical guide 108. In some embodiments, the assembly 100 can be submerged in the liquid optical medium 107. In other embodiments, there may only be a small layer of the liquid optical medium 107 and the assembly 100 may be surrounded by air or another gaseous medium.

The workpiece 101 may include a transparent first piece 102 and a second piece 105. The first piece 102 may include a curved surface 103 and a first target surface 104. The curved surface 103 may include a rough surface due to a manufacturing process. While the curved surface 103 is shown as curved, the curved surface 103 may include any geometry. For example, the curved surface 103 may include any number of angles or varying curves, or combination thereof.

The second piece 105 may include a second target surface 106. Although only the transparent first piece 102 and the second piece 105 are shown, the workpiece 101 may include any number of pieces. In some embodiments, the workpiece 101 may be hollow. In other embodiments, the workpiece 101 may be solid.

The liquid optical medium 107 is shown as a thin layer, applied to the curved surface 103. The liquid optical medium 107 may be applied to the curved surface 103 prior to the clear optical guide being mated to the transparent first piece 102. The liquid optical medium 107 may mitigate unwanted effects of a rough finish on the curved surface 103. The liquid optical medium 107 may be any liquid with an index of refraction substantially equal to a material made to fabricate the transparent first piece 102. In some embodiments, the liquid optical medium 107 includes a refractive index within 10% of an index of refraction associated with the transparent first piece 102.

In an example embodiment, the transparent first piece 102 may be fabricated from borosilicate glass with an index of refraction of about 1.51. In this example, mineral oil may be used, having an index of refraction of about 1.47. Other suitable liquid optical mediums may include lanolin, cedar wood oil, castor oil, glycerol, kerosene, turpentine, ethyl salicylate, chlorobenzene, and liquid paraffin. This list is not exhaustive and is not meant to be limiting. One of ordinary skill in the art would recognize many different options and alternatives in choosing a liquid optical medium.

The optical guide 108 may be in contact with the transparent first piece 102. The optical guide 108 may be configured such that all sides of the optical guide 108 extend beyond all sides of the transparent first piece 102. In some embodiments, the optical guide 108 may completely cover the transparent first piece 102 and cover at least some portion of the second piece 105.

The optical guide 108 may also include a flat surface 110 and an interface surface 109, configured to form-fit the curved surface 103 of the transparent first piece 101. Although configured to form-fit the curved surface 103, there may be small gaps between the optical guide 108 and the transparent first piece 102. The liquid optical medium 107 may fill these gaps, allowing for light, such as a laser beam, to propagate through the optical guide 108, the liquid optical medium 107, the transparent first piece 102, and the second piece 105 without a significant change in associated indices of refraction. In some embodiments, the indices of refraction associated with each of the components of assembly 100 may be within a predetermined range, such that any deviation of the laser beam is negligible. The predetermined range may be within 10% of the index of refraction of any component of assembly 100.

Figure 2:
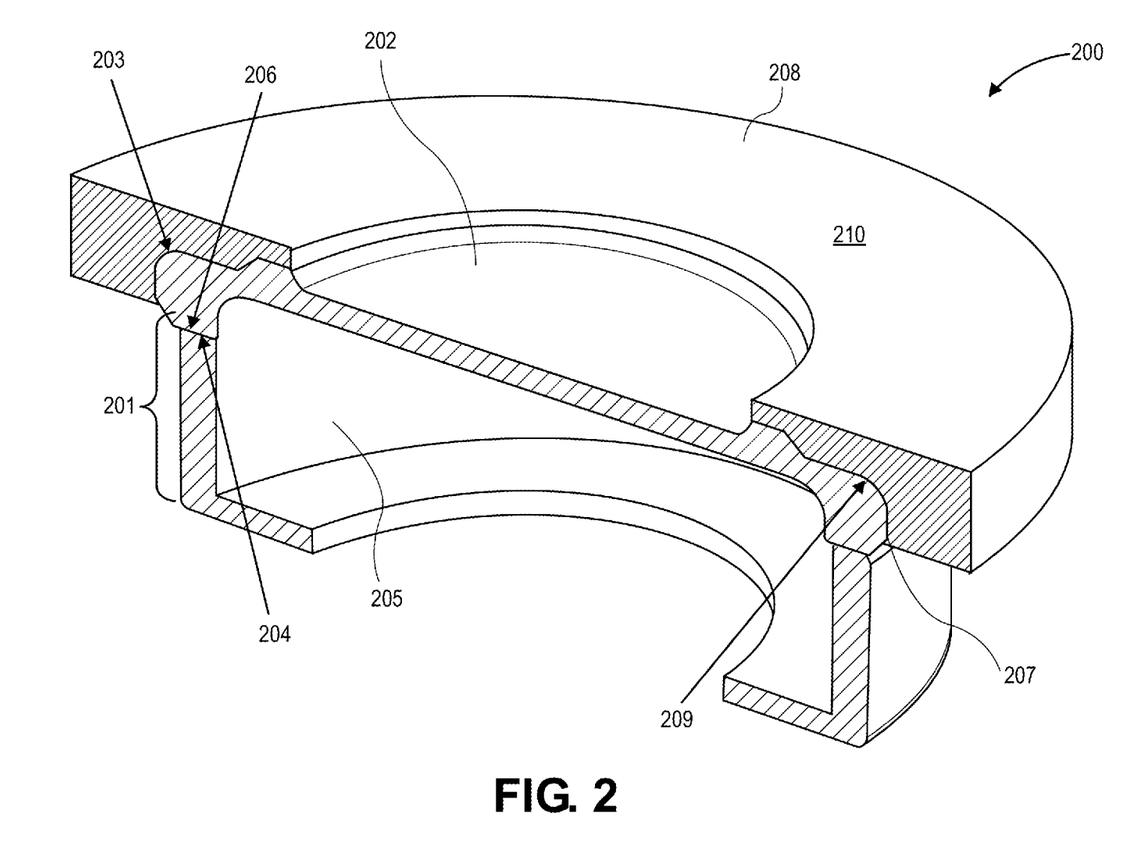
FIG. 2 illustrates a workpiece and an optical guide according to other embodiments.

FIG. 2 shows a workpiece and an optical guide according to certain embodiments. An assembly 200 shows a workpiece 201, a liquid optical medium 207, and an optical guide 208. In some embodiments, the assembly 200 can be submerged in the liquid optical medium 207. In other embodiments, there may only be a small layer of the liquid optical medium 207 and the assembly 200 may be surrounded by air or another gaseous medium.

The workpiece 201 may include a transparent first piece 202 and a second piece 205. The first piece 202 may include a varied surface 203 and a first target surface 204. The varied surface 203 may include a rough surface due to a manufacturing process. The varied surface 203 may include any number of curves, angles, or flat portions at any location of the varied surface 203.

The second piece 205 may include a second target surface 206. Although only the transparent first piece 202 and the second piece 205 are shown, the workpiece 201 may include any number of pieces. In some embodiments, the workpiece 201 may be hollow. In other embodiments, the workpiece 201 may be solid.

The liquid optical medium 207 is shown as a thin layer, applied to the varied surface 203. The liquid optical medium 207 may be applied to the varied surface 203 prior to the clear optical guide being mated to the transparent first piece 202. The liquid optical medium 207 may mitigate unwanted effects of a rough finish on the varied surface 203. The liquid optical medium 207 may be any liquid with an index of refraction substantially equal to a material made to fabricate the transparent first piece 202. In some embodiments, the liquid optical medium 207 includes a refractive index within 10% of an index of refraction associated with the transparent first piece 202.

In an example embodiment, the transparent first piece 202 may be fabricated from borosilicate glass with an index of refraction of about 1.51. In this example, mineral oil may be used, having an index of refraction of about 1.47. Other suitable liquid optical mediums may include lanolin, cedar wood oil, castor oil, glycerol, kerosene, turpentine, ethyl salicylate, chlorobenzene, and liquid paraffin. This list is not exhaustive and is not meant to be limiting. One of ordinary skill in the art would recognize many different options and alternatives in choosing a liquid optical medium.

The optical guide 208 may be in contact with the transparent first piece 202. The optical guide 208 may be configured such that all sides of the optical guide 208 extend beyond all sides of the transparent first piece 202. In some embodiments, the optical guide 208 may completely cover the transparent first piece 202 and cover at least some portion of the second piece 205.

The optical guide 208 may also include a flat surface 210 and an interface surface 209, configured to form-fit the varied surface 203 of the transparent first piece 201. Although configured to form-fit the varied surface 203, there may be small gaps between the optical guide 208 and the transparent first piece 202. The liquid optical medium 207 may fill these gaps, allowing for light, such as a laser beam, to propagate through the optical guide 208, the liquid optical medium 207, the transparent first piece 202, and the second piece 205 without a significant change in associated indices of refraction. In some embodiments, the indices of refraction associated with each of the components of assembly 200 may be within a predetermined range, such that any deviation of the laser beam is negligible. The predetermined range may be within 10% of the index of refraction of any component of assembly 200.

Although the embodiments discussed below are described and/or shown as curved, it should be understood that these figures are only exemplary, and not meant to be limiting. Any varied geometry, such as is described in FIG. 2, may be used in the techniques and systems below.

Figure 3:
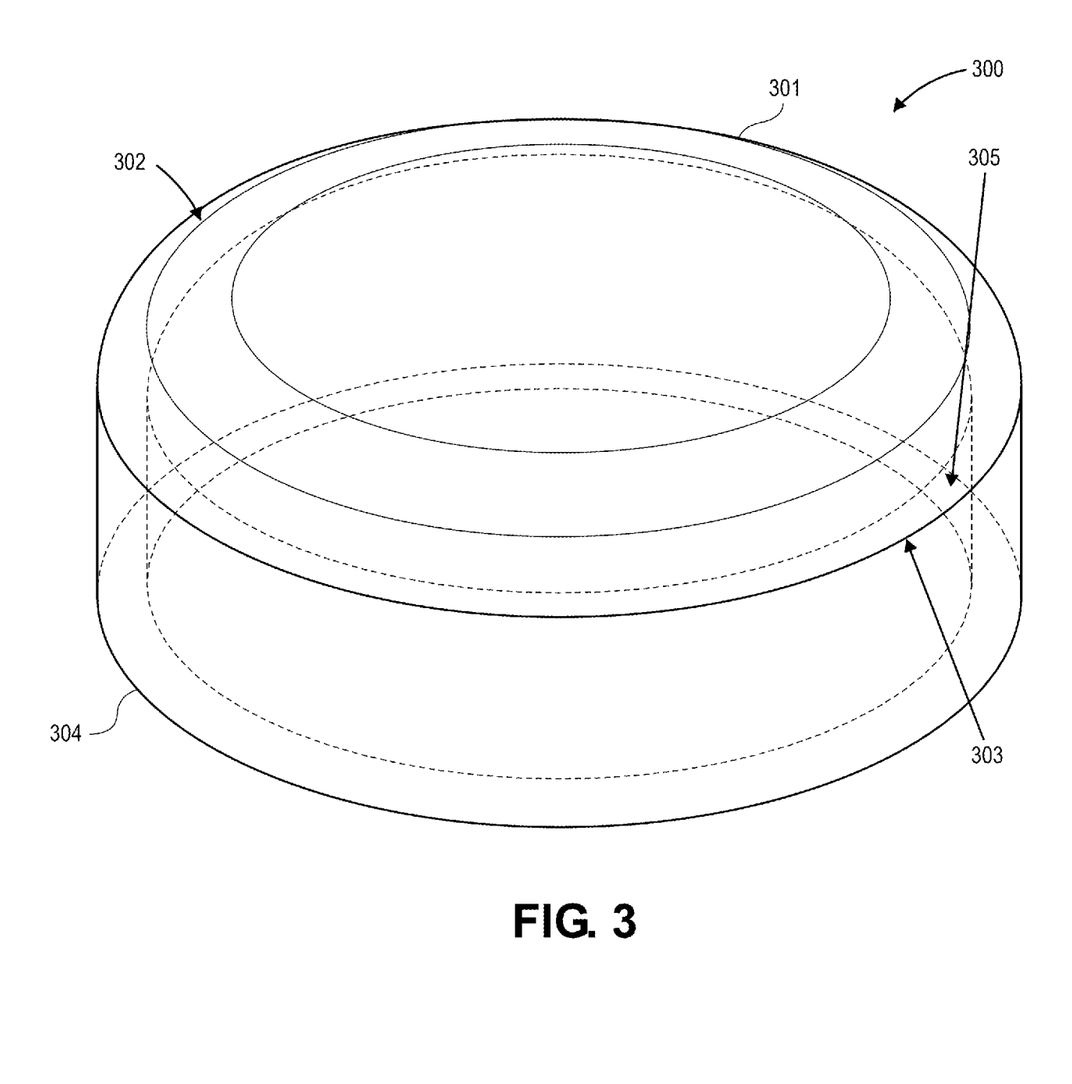
FIG. 3 illustrates a workpiece according to some embodiments.

FIG. 3 illustrates a workpiece 300 according to some embodiments. The workpiece 300 may be analogous to the workpiece 101 in FIG. 1. The workpiece 300 may include a transparent first piece 301 and a second piece 304. Although only two pieces are shown, the workpiece 300 may include more pieces.

The transparent first piece 301 may be manufactured from a suitable material which permits light, such as that of a laser beam, to propagate through the transparent first piece 301. Suitable materials may include glass, sapphire, and other materials. Glass may further include borosilicate glass, non-silicate glass, fused silica, quartz, and other glasses.

The transparent first piece 301 may include a curved surface 302 and a first target surface 303. The curved surface 302 may include a simple curve as illustrated, or may include any number of edges, curves, or geometries. In other embodiments, the curved surface 302 may not have a curve and may be a flat surface. The first piece 301 may meet the second piece 304 such that the first piece 301 and second piece 304 form workpiece 300 once joined. In some embodiments, workpiece 300 may be hermetically sealed after joining the transparent first piece 301 and second piece 304.

In some embodiments, the curved surface 302 may be formed during an initial fabrication of the transparent first piece 301, for example by molding. In other embodiments, the curved surface 302 may be formed through a grinding process after the initial formation of the transparent first piece 301. The grinding process may leave the curved surface 302 with imperfections resulting in a rough surface. While the body of the transparent first piece is operable to transmit light, the rough finish on the curved surface 302 left by the grinding process may not allow transmission of light into the transparent first piece 301. The application of an optical medium, such as the liquid optical medium 107 in FIG. 1, may mitigate the effects of the rough finish, and allow transmission of a laser beam into the transparent first surface 301.

The transparent first piece 301 may also include a first target surface 303. The first target surface 303 may have a width less than the radius of the first transparent piece 301 and/or the second piece 304, leaving a hollow space within the workpiece 300. In some embodiments, the transparent first piece 301 may be solid, without a hollow portion. The first target surface 303 may then include an entire surface area of the transparent first piece 301.

The second piece 304 may be composed of a suitable material which permits light, such as that of a laser beam, to propagate through the transparent first piece. Suitable materials may include glass, sapphire, or other material. Glass may further include borosilicate glass, non-silicate glass, fused silica, quartz, or other glasses. In some embodiments, the second piece 304 may be manufactured from the same material as the transparent first piece 301. In other embodiments, the second piece 304 may be manufactured from a different material, including ceramics, silicon, and metals. Metals may include stainless steel, carbon steels, high-strength low-alloy steels, aluminum, titanium, and other suitable metals.

The second piece 304 may include a second target surface 305. FIG. 300 shows the second target surface in contact with the first target surface 303. The second target surface 305 may match the first target surface 303 such that when joined, workpiece 300 is hermetically sealed. In some embodiments, the second target surface 305 may be some width less than a radius of workpiece 300, such that a hollow space is defined in workpiece 300. In other embodiments, the second piece 304 may be solid, and the second target surface 305 may comprise an entire surface area of the second piece 304.

In some embodiments, the workpiece 300 may be a biological implant housing. The workpiece 300 may contain thin-film electrodes, system-on-a-chip packages, integrated circuit packages, and other electronic devices. In other embodiments, the workpiece 300 may be an optical device comprised of various components such as diffractive gratings, prisms, or other optical components. In yet another embodiment, the workpiece 300 may be a housing for microelectromechanical (MEMS) devices, sensors, or other devices that may need to be isolated or protected from an environment (such as outer space).

Additionally, although workpiece 300 is shown as round, the workpiece 300 may be of any geometry. For example, the workpiece 300 may include any number and degree of angles and/or curves. One of ordinary skill in the art, with the benefit of this disclosure, would recognize many different possibilities and configurations.

Figure 4A:
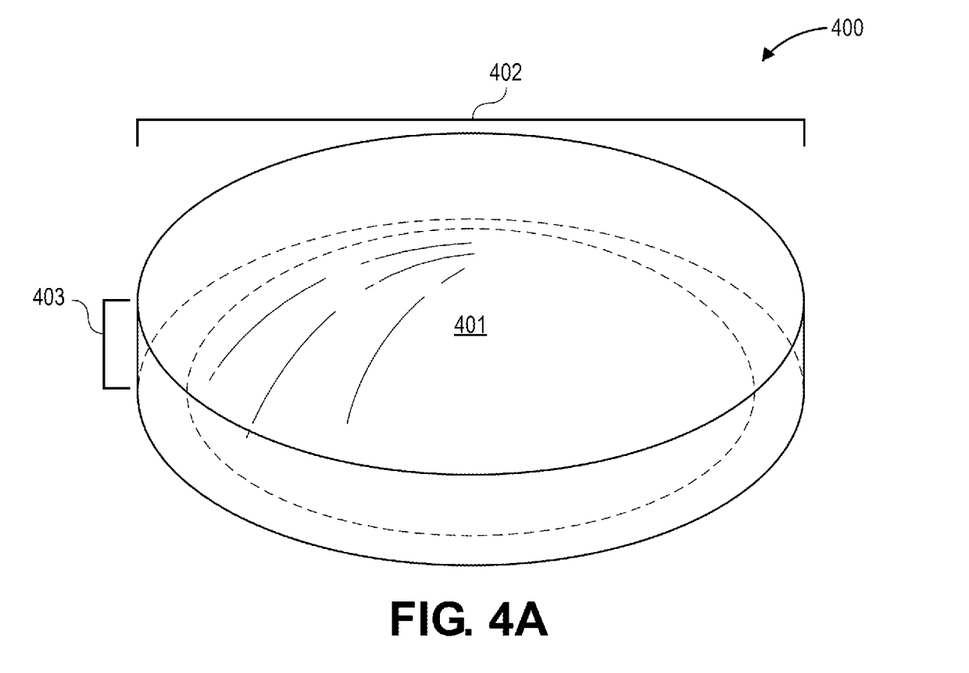
FIG. 4A illustrates a top perspective of an optical guide according to some embodiments.

FIG. 4A shows a top perspective of an optical guide 400, according to some embodiments. The optical guide 400 includes a flat surface 401, a width 402 and a depth 403. The optical guide 400 may be analogous to the optical guide 108 shown in FIG. 1. The optical guide 400 may be fabricated in order to facilitate the formation of an associated workpiece through laser welding, for example the transparent first piece 301 and the second piece 304 described in FIG. 3. The optical guide 400 may be clear or may have some regions that are clear and other regions that are opaque.

The width 402 may be larger than a width of the associated workpiece, allowing for laser welding to be achieved independent of a width of the associated workpiece. In some embodiments, the depth 403 may be configured such that the optical guide 400 extends beyond a location to be welded on the associated workpiece, enabling edge-to-edge welding. In other embodiments, the depth 403 may only extend enough to accommodate a laser to reach a location to be welded on the associated workpiece.

Figure 4B:
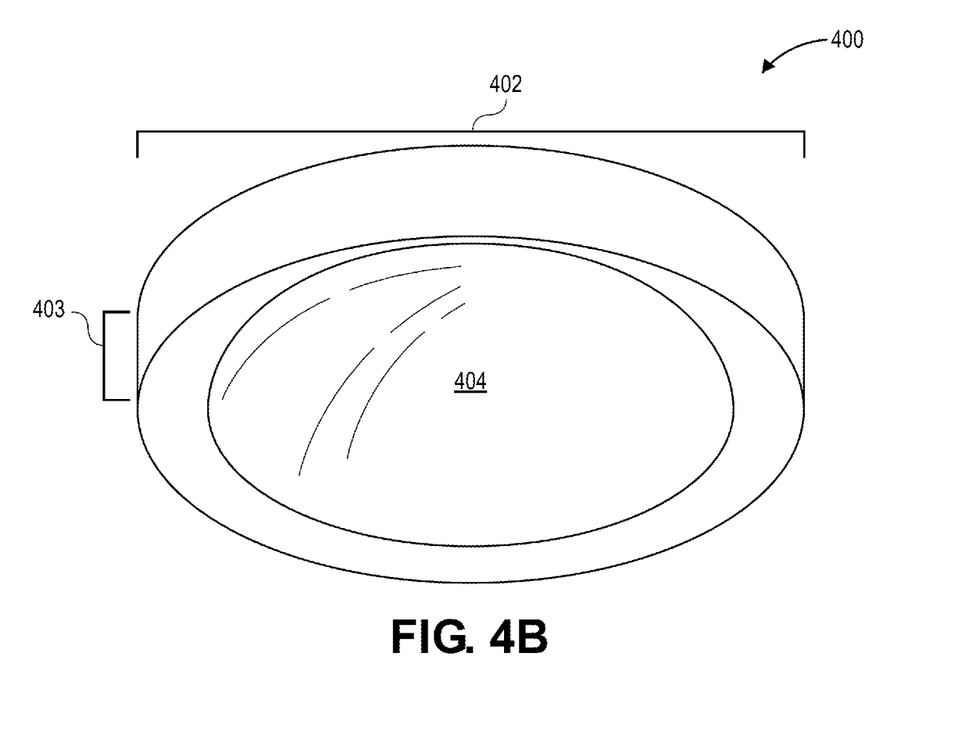
FIG. 4B illustrates a bottom perspective of an optical guide according to some embodiments.

FIG. 4B shows a bottom perspective of an optical guide 400 according to some embodiments. The interface surface 404 is concave. In some embodiments, the interface surface 404 may be fabricated to form-fit the curved surface of a workpiece, for example the curved surface 302 shown in FIG. 3. Although FIG. 4B shows interface surface 404 as rounded, the interface surface 404 may have any geometry, fabricated to form-fit an associated workpiece.

In some embodiments, the optical guide 400 may be fabricated from a suitable transparent material. Suitable materials may include glass, sapphire, or other material. Glass may further include borosilicate glass, non-silicate glass, fused silica, quartz, or other glasses. The optical guide 400 may include a material may identical to a material used to fabricate an associated workpiece. In some embodiments, the clear optical guide may be fabricated from a material with a refractive index within 10% of the index of refraction of an associated workpiece.

Figure 5:
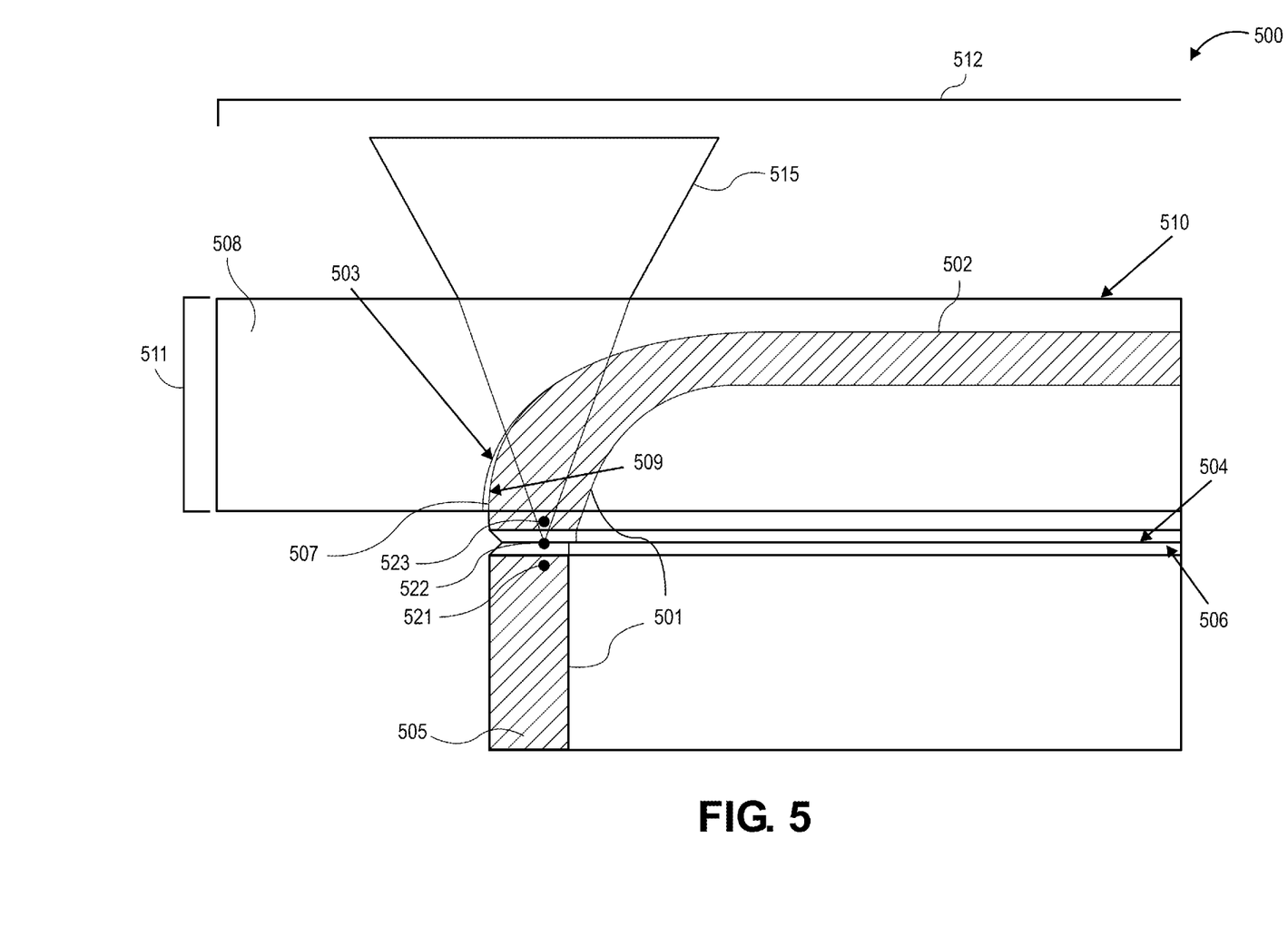
FIG. 5 illustrates a cross-section view of a workpiece with a curved surface being joined by laser welding, utilizing a clear optical guide, according to some embodiments

FIG. 5 shows a workpiece with a curved surface being joined by laser welding, utilizing a clear optical guide, according to some embodiments. An assembly 500 may be analogous to assembly 100, described in FIG. 1, during a laser welding process. The assembly 500 may include a curved workpiece 501 and associated components, a liquid optical medium 507, and an optical guide 508, form-fitted to the curved workpiece 501 and including associated components. A laser beam 515 is also shown, incident on the optical guide 508 and focused on a location to be welded 522. The beam geometry changes slightly passing from air to glass due to refraction.

In some embodiments, the laser beam 515 is a pulsed laser. The operating frequency of laser beam 515 may be within a range of 1.0-500 femtoseconds, inclusive.

The curved workpiece 501 may include a transparent first piece 502 and a second piece 505. Transparent first piece 502 may include a curved surface 503 and a first target surface 504. The second piece 505 may include a second target surface 506. The first target surface 504 may be in contact with the second target surface 506, forming the location to be welded 522.

The transparent first piece 502 may be manufactured from a suitable material which permits light, such as that of a laser beam, to propagate through the transparent first piece 502. Suitable materials may include glass, sapphire, and other materials. Glass may further include borosilicate glass, non-silicate glass, fused silica, quartz, or other glasses. In some embodiments, the second piece 505 may be manufactured from the same material as the transparent first piece 502. In other embodiments, the second piece 505 may be manufactured from a different material, including ceramics, silicon, and metals. Metals may include stainless steel, carbon steels, high-strength low-alloy steels, aluminum, titanium, and other suitable metals.

The curved surface 503 may include a rough finish as a result of a manufacturing process. The rough finish may prevent light from being transmitted effectively through the transparent first piece 502. A liquid optical medium 507 may be applied to the curved surface 503, mitigating the effects of the rough finish and allowing light to be transmitted through the curved surface 503.

The liquid optical medium 507 may be any liquid with an index of refraction substantially equal to a material made to fabricate the transparent first piece 502. In some embodiments, the liquid optical medium 507 includes a refractive index within 1%, 2%, 3%, 4%, 5%, 6%, 7%, 8%, 9%, 10%, 11%, 12%, 13%, 14%, 15%, or 20% of an index of refraction associated with the transparent first piece 502. In an example embodiment, the transparent first piece 502 may be fabricated from borosilicate glass with an index of refraction of about 1.51. Mineral oil may be used as a liquid optical medium, having an index of refraction of about 1.47. Other suitable liquid optical mediums may include lanolin, cedar wood oil, castor oil, glycerol, kerosene, turpentine, ethyl salicylate, chlorobenzene, and liquid paraffin. This list is not exhaustive and is not meant to be limiting. One of ordinary skill in the art would recognize many different options and alternatives in choosing a liquid optical medium 507.

The optical guide 508 may be manufactured from an identical material to that used to fabricate the transparent first piece 502. In other embodiments, the optical guide may be fabricated from a different material with a substantially equal index of refraction. In all embodiments, the optical guide 508 may be mated to the transparent first piece 502, with an interface surface 509 form-fit to the curved surface 503. The interface surface 509 may be fabricated to form-fit the curved surface 503. Any gaps between the interface surface 509 and the curved surface 503 may cause a variation in the indices of refraction experienced by the laser beam 515 as the laser beam 515 passes between the optical guide 508 and the transparent first piece 502. The application of the liquid optical medium 507 to the curved surface 503 may fill any such gaps, allowing for a consistent index of refraction between the optical guide 508 and the transparent first piece 502.

The optical guide 508 may also include a flat surface 510, a depth 511 and a width 512. In the present embodiment, the depth 511 of the optical guide 508 extends only partially through the transparent first piece 502. In other embodiments, the depth 511 may extend past the first transparent piece 502, covering the location to be welded 522, and at least partially covering the second piece 505, allowing edge-to-edge welding.

A laser beam 515 may be incident on the flat surface of the clear optical guide 508. In the present embodiment, the width 512 of the clear optical guide 508 is greater than the width of the curved workpiece 501. In the figure, the optical guide 508 overhangs the curved workpiece 501. Because the width 512 is greater than the width of the curved workpiece 501, and the optical guide 508 includes a flat surface, the effects of the curved surface 503 on the laser beam 515 may be nullified. Furthermore, because the liquid optical medium 507 has filled any gaps between the interface surface 509 and the curved surface 503, as well as mitigated the effects of any rough finish left on curved surface 503, the full power of laser beam 515 is transmitted through assembly 500 to location to be welded 522.

A first location may be identified in either the transparent first piece or the second piece. A final location may then be identified on the piece opposite to that including the first location. In this case, the first location 521 is in second piece 505, and the second location 523 is in first piece 502. A path may then be defined between the first location 521 and the second location 523. The path may cross the first target surface 504 and the second target surface 506 at location to be welded 522. The laser beam 515 may be directed along the path, creating welds according to an operating pulse frequency of the laser beam 515. The laser beam 515 may then be directed to another location on the curved workpiece 501, and welds made using the same process. This may be repeated until the curved workpiece is sealed, meeting or exceeding a predetermined parameter.

While FIG. 5 shows the first location 521 included on the second piece 505 and the final location on the transparent first piece 502, this is just one example. In other embodiments, a first location may be identified on the transparent first piece 502 and the final location may be identified on the second piece 505. The laser beam 515 may then directed along the path, creating welds according to an operating pulse frequency of the laser beam 515.

Figure 6:
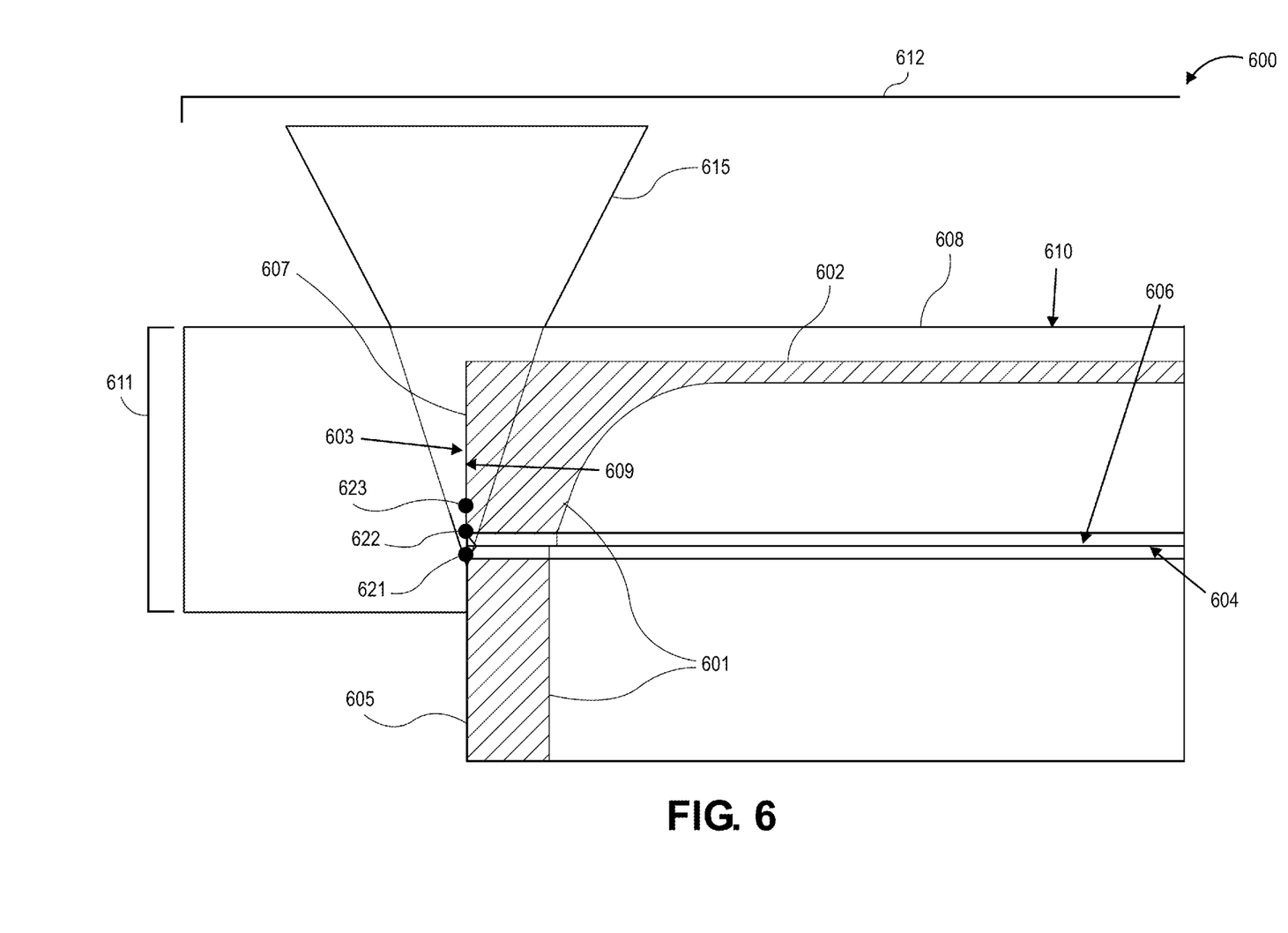
FIG. 6 illustrates a cross-section view of a workpiece being joined at an edge, utilizing an optical guide according to some embodiments.

FIG. 6 shows a work piece being joined at an edge, utilizing an optical guide according to some embodiments. The assembly 600 may be analogous to assembly 100, described in FIG. 1, during a laser welding process. Assembly 600 may include a workpiece 601 and associated components, a liquid optical medium 607, and an optical guide 608, form-fitted to the workpiece 601 and including associated components. The liquid optical medium 607 is shown as a thin layer of liquid between an initial surface 603 and an interface surface 609. A laser beam 615 is also shown, incident on the optical guide 608 and focused on a location to be welded 622.

In some embodiments, the laser beam 615 is a pulsed laser. The operating frequency of laser beam 615 may be within a range of 1.0-500 femtoseconds, inclusive.

The workpiece 601 may include a transparent first piece 602 and a second piece 605. Transparent first piece 602 may include the initial surface 603 and a first target surface 604. The second piece 605 may include a second target surface 606. The first target surface 604 may be in contact with the second target surface 606, forming the location to be welded 622. In some embodiments, the location to be welded 622 may be on an edge of workpiece 601.

The transparent first piece 602 may be manufactured from a suitable material which permits light, such as that of a laser beam, to propagate through the transparent first piece 602. Suitable materials may include glass, sapphire, and other materials. Glass may further include borosilicate glass, non-silicate glass, fused silica, quartz, and other glasses. In some embodiments, the second piece 605 may be manufactured from the same material as the transparent first piece 602. In other embodiments, the second piece 605 may be manufactured from a different material, including ceramics, silicon, and metals. Metals may include stainless steel, carbon steels, high-strength low-alloy steels, aluminum, titanium, and other suitable metals.

The initial surface 603 may include a rough finish as a result of a manufacturing process. The rough finish may prevent light from being transmitted effectively through the transparent first piece 602. A liquid optical medium 607 may be applied to the initial surface 603, mitigating the effects of the rough finish and allowing light to be transmitted through the initial surface.

The liquid optical medium 607 may be any liquid with an index of refraction substantially equal to a material made to fabricate the transparent first piece 602. In some embodiments, the liquid optical medium 607 includes a refractive index within 1%, 2%, 3%, 4%, 5%, 6%, 7%, 8%, 9%, 10%, 11%, 12%, 13%, 14%, 15%, or 20% of an index of refraction associated with the workpiece 601. In an example embodiment, the transparent first piece 602 may be fabricated from borosilicate glass with an index of refraction of about 1.51. Mineral oil may then be used as a liquid optical medium, having an index of refraction of about 1.47. Other suitable liquid optical mediums may include lanolin, cedar wood oil, castor oil, glycerol, kerosene, turpentine, ethyl salicylate, chlorobenzene, and liquid paraffin. This list is not exhaustive and is not meant to be limiting. One of ordinary skill in the art would instantly recognize many different options and alternatives in choosing a liquid optical medium.

In some embodiments, the optical guide 608 is made from an identical material to that used to fabricate the transparent first piece 602. In other embodiments, the optical guide may be fabricated from a different material with a substantially equal index of refraction to that of the material used to fabricate the transparent first piece 602. In all embodiments, the optical guide 608 may be mated to the transparent first piece 602, with the interface surface 609 form-fit to the initial surface 603. The interface surface 609 may be fabricated to form-fit the initial surface 603. Any gaps between the interface surface 609 and the initial surface 603 may cause a variation in the indices of refraction experienced by the laser beam 615 as the laser beam 615 passes between the optical guide 608 and the transparent first piece 602. The application of the liquid optical medium 607 to the initial surface 603 may fill any such gaps, allowing for a consistent index of refraction between the optical guide 608 and the transparent first piece 602.

The optical guide 608 may also include a flat surface 610, a depth 611 and a width 612. In some embodiments, the depth 611 of the optical guide 608 may extend past the first transparent piece 602, covering the location to be welded 622, and at least partially covering the second piece 605, allowing edge-to-edge welding.

A laser beam 615 may be incident on the flat surface of the clear optical guide 608. In the present embodiment, the width 612 of the clear optical guide 608 is greater than the width of the workpiece 601, overhanging it. Furthermore, liquid optical medium 607 has filled any gaps between the interface surface 609 and the initial surface 603, as well as mitigated the effects of any rough finish left on initial surface 603. As the width 612 is greater than the width of the workpiece 601, the depth 611 extends beyond the location to be welded 622, and the liquid optical medium has filled any gaps, the optical guide 608, liquid optical medium 607, and transparent first piece 602 may transmit laser beam 615 to the location to be welded 622, mitigating the effects of clipping due to an edge of workpiece 601. This allows laser beam 615 to be focused on the edge of the workpiece 601, creating welds.

A first location may be identified in either the transparent first piece or the second piece. A final location may then be identified on the piece opposite to that including the first location. In this case, the first location 621 is in second piece 605, and the second location 623 is in first piece 602. A path may then be defined between the first location 621 and the second location 623. The path may cross the first target surface and the second target surface at location to be welded 622. The laser beam 615 may be directed along the path, creating welds according to an operating pule frequency of the laser beam 615. The laser beam 615 may then be directed to another location on the curved workpiece 601, and welds made using the same process. This may be repeated until the curved workpiece is hermetically sealed, meeting or exceeding a predetermined parameter. While FIG. 6 shows the first location 621 included on the second piece 605 and the final location on the transparent first piece 602, this is just one example. In other embodiments, a first location may be identified on the transparent first piece 602 and the final location may be identified on the second piece 605. The laser beam 615 may then directed along the path, creating welds according to an operating pulse frequency of the laser beam 615.

Figure 7:
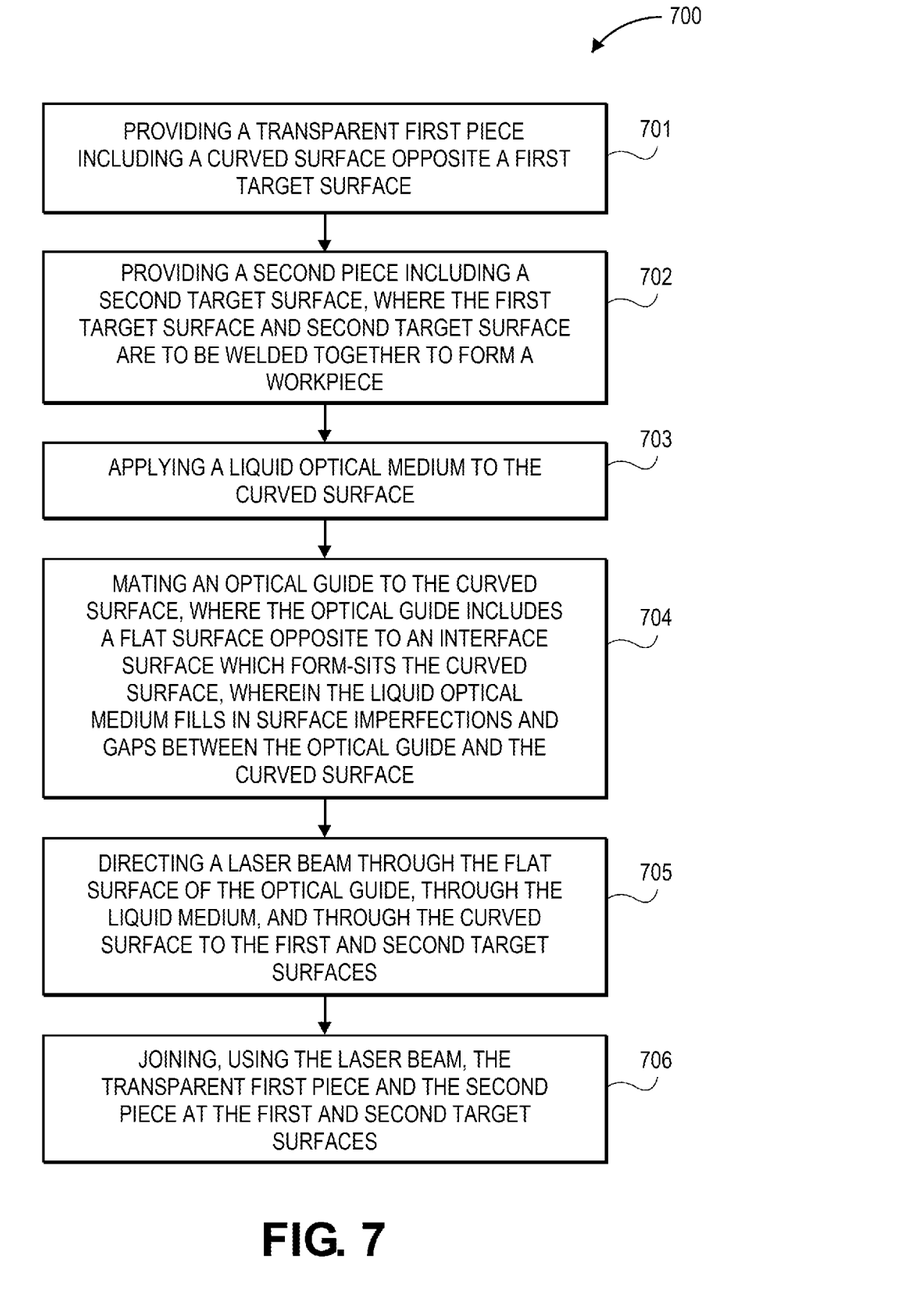
FIG. 7 is a flowchart illustrating a method of laser welding through a curved transparent material according to an embodiment.

FIG. 7 is a flowchart illustrating a method of laser welding through a curved transparent material according to an embodiment. In operation 701, a transparent first piece, including a curved surface opposite a first target surface is provided. In operation 702, a second piece is provided, including a second target surface where the first and second target surfaces are to be welded together to form a workpiece. In operation 703, a liquid optical medium is applied to the curved surface. In operation 704, an optical guide is mated to the curved surface, wherein the optical guide includes a flat surface opposite to an interface surface and the liquid optical medium fills in surface imperfections and gaps between the optical guide and the curved surface. In operation 705, a laser beam is directed through the flat surface of the optical guide, through the liquid medium, and through the curved surface to the first and second target surfaces. In operation 706, the transparent first piece and the second piece are joined, using the laser beam, at the first and second target surfaces.

In some embodiments, the method 700 may further include determining a first location on either the transparent first piece or the second piece and determining a final location on the piece opposite to that including the first location. A path may then be defined between the first and final locations which crosses the first and second target surfaces. The laser beam may then be directed along the path, and the first piece and second piece welded to form the workpiece.

In some embodiments, the method 700 may be performed in a different order than is presented. Embodiments may omit or add steps to the method 700 as well. One of ordinary skill in the art would recognize many possibilities and variations of embodiments disclosed herein.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

In some embodiments, the systems and methods of the present disclosure can be used in connection with neurosurgical techniques. However, one skilled in the art would recognize that neurosurgical techniques are a non-limiting application, and the systems and methods of the present disclosure can be used in connection with any biological tissue. Biological tissue can include, but is not limited to, the brain, muscle, liver, pancreas, spleen, kidney, bladder, intestine, heart, stomach, skin, colon, and the like.

The systems and methods of the present disclosure can be used on any suitable multicellular organism including, but not limited to, invertebrates, vertebrates, fish, bird, mammals, rodents (e.g., mice, rats), ungulates, cows, sheep, pigs, horses, non-human primates, and humans. Moreover, biological tissue can be ex vivo (e.g., tissue explant), or in vivo (e.g., the method is a surgical procedure performed on a patient).

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A method for laser welding through a curved transparent material, the method comprising:
   providing a transparent first piece comprising a curved surface and a first target surface, wherein the first target surface is opposite the curved surface;
   providing a second piece comprising a second target surface, the first target surface and the second target surface to be welded together to form a workpiece;
   applying a liquid optical medium to the curved surface;
   mating an optical guide to the curved surface, the optical guide having a flat surface opposite to an interface surface which form-fits the curved surface, wherein the liquid optical medium fills surface imperfections and gaps between the optical guide and the curved surface;
   directing a laser beam through the flat surface of the optical guide, through the liquid optical medium, and through the curved surface to the first and second target surfaces; and
   joining, using the laser beam, the transparent first piece and the second piece at the first and second target surfaces.

2. The method of claim 1 wherein applying the liquid optical medium comprises submerging the transparent first piece, the second piece, and the optical guide in the liquid optical medium.

3. The method of claim 1 wherein the applying of the liquid optical medium to the curved surface includes applying the liquid optical medium to the optical guide and then mating the optical guide to the curved surface.

4. The method of claim 1 wherein the optical guide covers both the first target surface and the second target surface.

5. The method of claim 1 wherein the transparent first piece comprises glass and the second piece comprises one or more of silicon, metals, and glass.

6. The method of claim 1 wherein the optical guide comprises an index of refraction equal to a material used to fabricate the transparent first piece.

7. The method of claim 1 wherein the liquid optical medium comprises a refractive index equal to a material used to fabricate the transparent first piece.

8. The method of claim 1 wherein the optical medium comprises mineral oil.

9. The method of claim 1 wherein joining, using the laser beam, further comprises:
   determining a first location on either the transparent first piece or the second piece;
   determining a final location on the transparent first piece or the second piece not selected in the determining a first location step, located opposite to the transparent first piece or the second piece comprising the first location determined in the step directly above;
   defining a path between the first location and the final location which crosses the first target surface and the second target surface;
   directing the laser beam along the path; and
   welding the transparent first piece and the second piece to form the workpiece.

10. The method of claim 9 wherein an operating pulse frequency of the laser beam is within a range of 1.0 femtoseconds to 500 femtoseconds, inclusive.

11. The method of claim 1 wherein joining, using the laser beam, comprises edge-to-edge welding.

* * * * *